Sept. 22, 1959    G. J. LIRETTE ET AL    2,904,920
ICE FISHING ROD
Filed Nov. 15, 1957    2 Sheets-Sheet 2
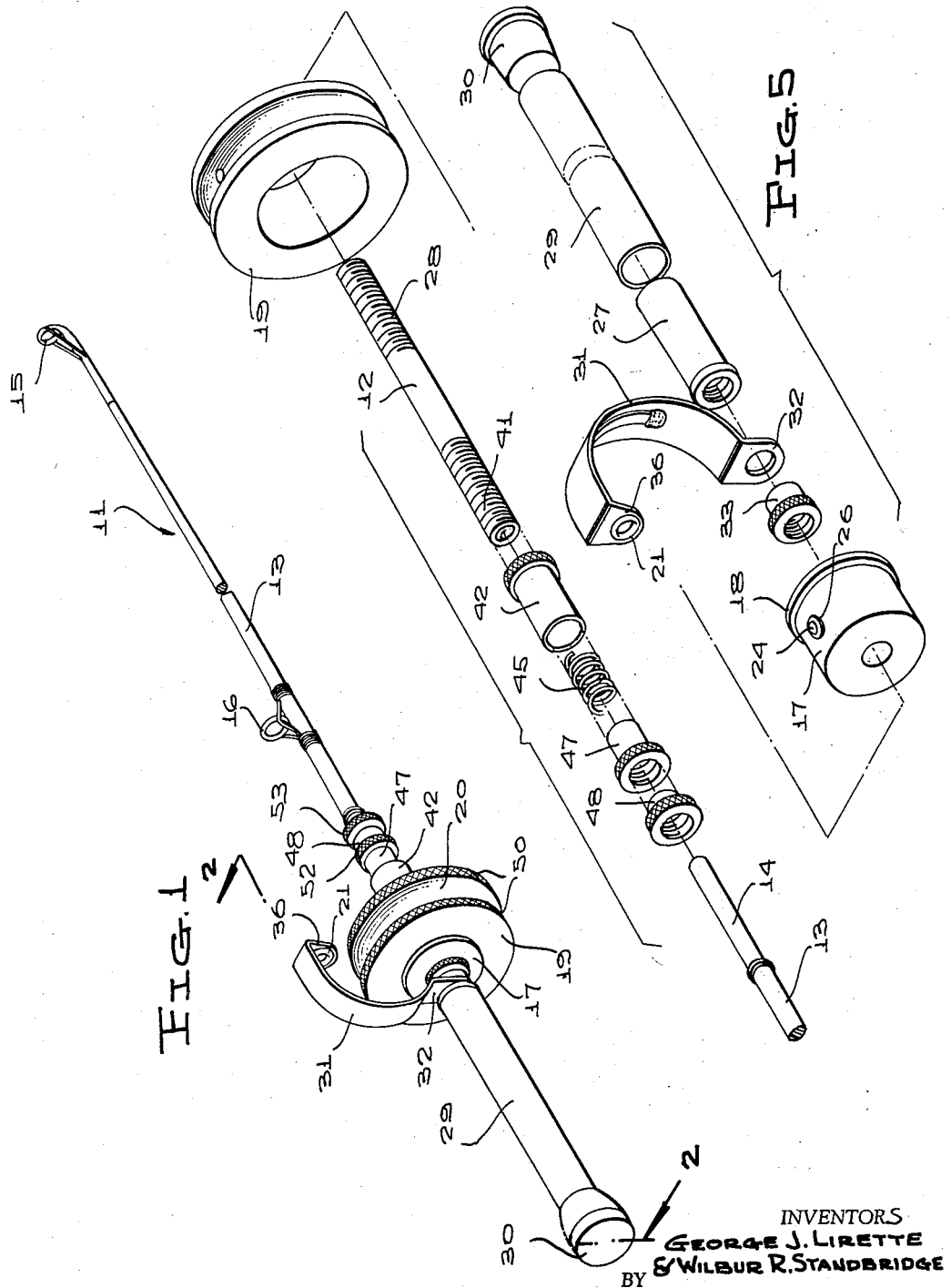
INVENTORS
GEORGE J. LIRETTE
& WILBUR R. STANDBRIDGE
BY
McMorrow, Berman & Davidson
ATTORNEYS

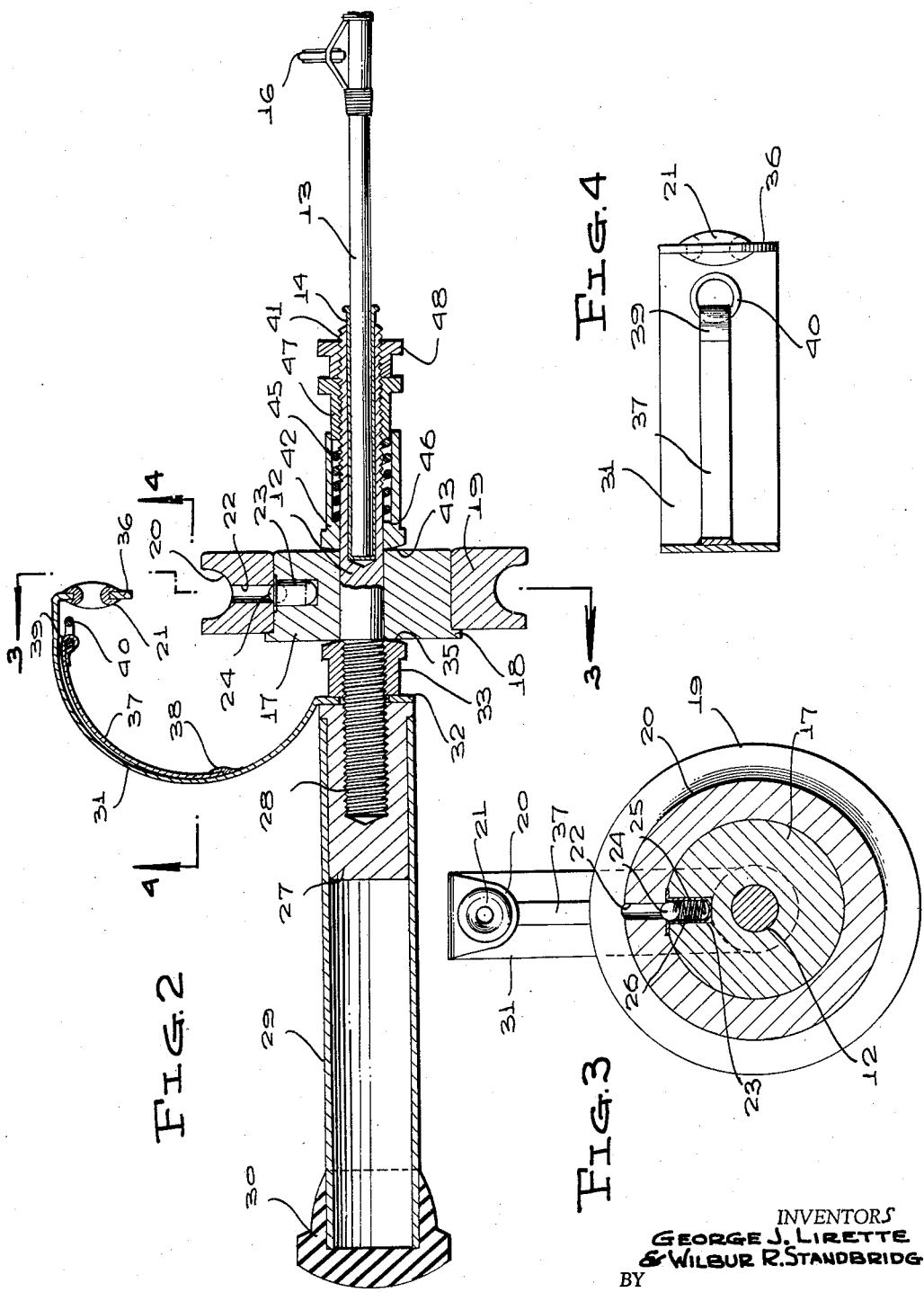

2,904,920
ICE FISHING ROD

George J. Lirette and Wilbur R. Standbridge,
Ann Arbor, Mich.

Application November 15, 1957, Serial No. 696,835

3 Claims. (Cl. 43—20)

This invention relates to fishing rods, and more particularly to a fishing rod especially adapted for use in fishing through the ice.

A main object of the invention is to provide a novel and improved ice fishing rod which is simple in construction, which is easy to handle, and which is provided with means for applying a desired adjustable retarding force on a fishing line so that it is not necessary to manually control the line as it unreels from the rod.

A further object of the invention is to provide an improved ice fishing rod which is inexpensive to manufacture, which is durable in construction, and which is provided with a reel whose rotation is retarded by an adjustably controlled degree so that a fishing line may unwind from the reel in a controlled manner without requiring manual operation of the reel and thus allowing the user to hold the rod without requiring the removal of gloves or mittens when the fishing line is unreeled, as when a fish is caught.

Further objects and advantages of the invention become apparent from the following description and claims, and from the accompanying drawings, wherein:

Figure 1 is a perspective view of an improved ice fishing rod constructed in accordance with the present invention.

Figure 2 is an enlarged vertical longitudinal cross-sectional view taken through the handle portion of the fishing rod on the line 2—2 of Figure 1.

Figure 3 is a transverse vertical cross-sectional view taken on the line 3—3 of Figure 2.

Figure 4 is a horizontal cross-sectional view taken on the line 4—4 of Figure 2.

Figure 5 is a perspective view showing the components of the fishing rod of Figures 1 to 4 in separated positions.

Referring to the drawings, the fishing rod is designated generally at 11 and comprises a shank member 12 in which is secured the conventional rod element 13, said rod element being provided with a ferrule 14 which is force-fitted in a suitable bore provided in the end of shank 12, whereby the rod element 13 is rigidly secured to the shank 12. The rod element 13 is provided at its end with the fishing line guide ring 15 and at its intermediate portion with an additional fishing line guide ring 16.

The intermediate portion of the shank member 12 has rotatably mounted thereon a generally cylindrical reel core 17, said reel core being formed at one margin with a peripheral flange or rib 18. Mounted on the reel core 17 is an annular, peripherally grooved reel body 19, said reel body having the outwardly facing peripheral groove 20 adapted to receive a fishing line wound up thereon, the line extending through a guide ring 21 supported outwardly adjacent to the peripheral groove 20, as shown in Figure 2, and being in the same longitudinal plane as the guide rings 15 and 16, whereby the line extends through its guide rings 16 and 15, as well as through the guide ring 21.

The reel body 19 is formed with a radial bore 2 defining a recess at its inner periphery, and the re core 17 is formed with a radial recess 23 in which mounted a ball detent 24, comprising a ball and a c spring 25 contained in a suitable socket 26 secured the recess 23, the ball 24 being lockingly engageable the end of the bore 22, which is somewhat smaller in c ameter than said ball, so that the end of the bore defines a ball-receiving recess. Thus, the reel body is yieldably locked to the core 17, but is not rotatab relative to said core.

The shank member 12 is provided with the thread end portion 28 which is threadedly engaged in a plu member 27 rigidly secured in the end of a tubular hand member 29. The handle member 29 is provided at i outer end with the removable rubber cap 30, so that tl main portion of the tubular handle 29 may be used a storage compartment for various small articles whi may be employed in conjunction with the fishing rod.

Designated at 31 is an arcuate bracket member havii a flat end portion 32 which is apertured to receive tl threaded end 28 of the shank 12, and which is dispose between the end of the plug member 27 and a bearir nut member 33, as shown in Figure 2. The bearing n member 33 is threaded on the shank portion 28 ar clamps the flat apertured end 32 of bracket member to the plug 27. The bearing nut 33 is provided adj; cent the reel core 17 with a rounded bearing surfac 35 engaging one side of the reel core 17.

The bracket 31 is formed at its outer end with a inwardly turned flat portion 36 in which the guide rir 21 is secured, as is clearly shown in Figure 2. The po tion 36 is disposed substantially in the same transver: vertical plane as the reel body 19.

Designated at 37 is a leaf spring which is rigidly s cured at one end thereof, as shown at 38, to the insid surface of the arcuate bracket member 31, the leaf sprir 37 extending toward the inwardly directed flat end 3 of the bracket member. The leaf spring 37 is forme at its outer end with a loop 39 in which is secured a guic ring 40 through which the fishing line is adapted to pa: before passing through the adjacent guide ring 21.

The shank 12 is formed with external threads 41 o the side thereof opposite the reel core 17, and slidabl engaged on the shank adjacent the reel core is a sleev member 42 having a rounded inner bearing surface 4 engaging the side of the core 17 opposite to that engage by the rounded surface 35 of the bearing nut 33. Di: posed in the sleeve 42 is a coiled spring 45 which sui rounds the shank member 12 and bears between a annular shoulder 46 formed in the sleeve 42 and a busk ing 47 threadedly engaged on the shank 12. The bust ing 47 may be adjusted on the threads 41 to vary th amount of force exerted on the coiled spring 45, thu varying the amount of clamping force exerted on the ree core 17 between the sleeve member 42 and the bearin nut 33.

A locking nut 48 is threadedly engaged on the externa threads 41 of shank 12 to lock the tension-adjusting nu 17 in adjusted position.

In using the device, a fishing line fastened on the ree body 19 and wound thereon extends through the rin 40, the guide ring 21, and the guide rings 16 and 1! The tension of the spring 45 is adjusted to exert a de sired retarding force on the reel core 17. When a fish i caught on the end of the line, the fish exerts a force o: the line, tending to unreel the line, whereby a torqu is exerted on the body 19 which is transmitted to th core 17. The rate of unreeling is regulated by the fric tional force exerted on the core 17 by the bearing mem bers 42 and 33, as above described. Thus, a controlle spring tension is provided, permitting the use of a rela ively light line, and preventing breakage of the line, as has hertofore occurred where the line is prevented from unreeling beyond a certain preset limit.

In the event of a sudden jerk or shock on the line, as in the case of a striking fish, the reel body 19 will experience a sudden torque sufficient to overcome the frictional resistance exerted on the reel core 17 by the spring 15, causing the reel body 19 and the reel core 17 to rotate as a unit against said resistance, and thereafter controlling the unwinding of the fishing line in accordance with the frictional force exerted on the reel core.

As will be seen from Figure 1, the reel body 19 is provided with knurled peripheral surfaces 50, allowing the reel to be readily wound up manually without requiring the user to remove his gloves or mittens.

The force exerted on the reel body 19 by the fishing line is cushioned by the resilient leaf spring 37, so that ordinary shock or jerks on the fishing line will not be sufficient to overcome the holding force of the spring bias detent ball 24.

As shown in Figure 2, the reel body 19 is normally secured on the core 17 by the spring biased detent ball 24 and is positioned against the flange or rib 18. Whenever it is desired to remove the reel body 19, for example, to substitute a different fishing line on another reel body, the original body may be readily removed from the core 17 and replaced by the other reel body carrying the desired fishing line.

As will be further noted from Figure 1, the nut members 47 and 48 are also provided with knurled outer flanges 52 and 53, respectively, whereby these nut members may be easily manipulated whenever it is desired to change the amount of tension provided by the spring 45.

While a specific embodiment of an improved ice fishing rod has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a fishing rod, a shank member, an elongated rod element rigidly secured in one end of said shank member coaxially therewith and provided with a fishing line guide ring at its end, a handle on the opposite end of said shank member, a reel rotatably mounted on said shank member coaxially therewith adjacent said handle, a retarding sleeve slidably and rotatably mounted on said shank member coaxially therewith and engaging said reel at one end, and spring means coaxially mounted on said shank member and engaging said sleeve, said spring means urging said sleeve axially into frictional engagement wtih said reel, whereby to retard rotation of the reel on the shank member.

2. In a fishing rod, a shank member, an elongated rod element rigidly secured in one end of said shank member coaxially therewith and provided with a fishing line guide ring at its end, a handle on the opposite end of said shank member, a reel rotatably mounted on said shank member coaxially therewith adjacent said handle, an abutment element surrounding said shank member and located between the reel and the handle, a retarding sleeve slidably and rotatably mounted on said shank member coaxially therewith on the side of the reel opposite said abutment element, one end of said sleeve engaging said reel, and spring means mounted coaxially on said shank member and engaging said sleeve, said spring means urging said sleeve axially into frictional engagement with said reel and urging the reel axially into frictional engagement with said abutment element, whereby to retard rotation of the reel on the shank member.

3. In a fishing rod, a shank member, an elongated rod element rigidly secured in one end of said shank member coaxially therewith and provided with a fishing line guide ring at its end, a handle on the opposite end of said shank member, an annular reel core rotatably mounted on said shank member coaxially therewith adjacent said handle, an abutment element surrounding said shank member and located between the reel and the handle, a retarding sleeve slidably and rotatably mounted on said shank member coaxially therewith on the side of the reel opposite said abutment element, one end of said sleeve having a rounded inner bearing surface engaging said reel, spring means mounted coaxially on said shank member and engaging said sleeve, said spring means urging said sleeve axially into frictional engagement with said reel and urging the reel axially into frictional engagement with said abutment element, whereby to retard rotation of the reel on the shank member, and a resilient arm secured to said shank adjacent said handle and being formed at its end with a fishing line guide aperture, said end being located adjacent the periphery of the reel.

References Cited in the file of this patent
UNITED STATES PATENTS

| | | |
|---|---|---|
| 342,844 | Ritter | June 1, 1886 |
| 1,351,549 | Benson | Aug. 31, 1920 |
| 2,299,156 | Lind | Oct. 20, 1942 |
| 2,783,952 | Clay | Mar. 5, 1957 |